Oct. 17, 1950     P. H. WINSLOW     2,526,597
CURRENT CONTROL SYSTEM

Filed Aug. 10, 1945     2 Sheets-Sheet 1

Inventor
PAUL HOWARD WINSLOW

By Clarence A. O'Brien
and Harvey B. Jackson
Attorneys

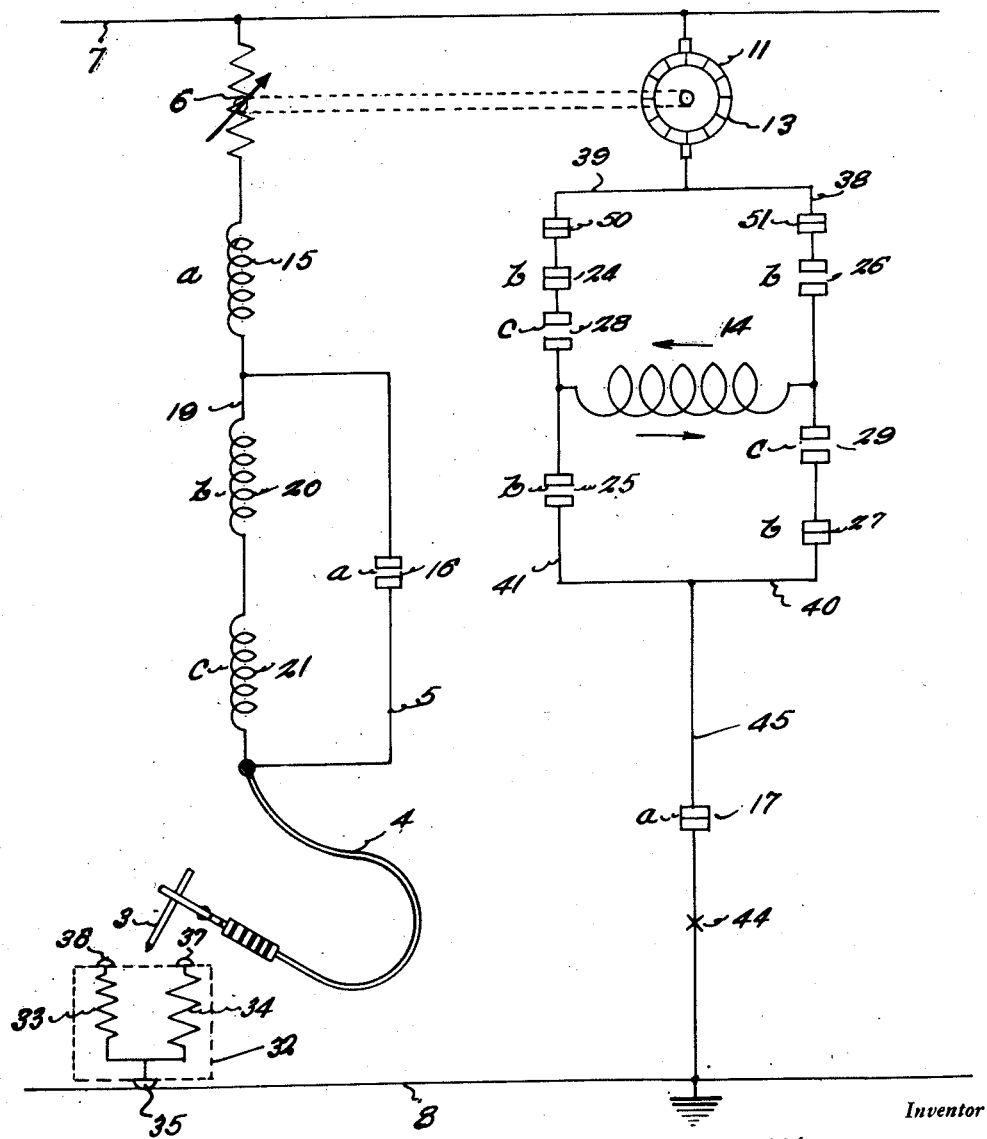

Patented Oct. 17, 1950

2,526,597

UNITED STATES PATENT OFFICE 2,526,597

CURRENT CONTROL SYSTEM

Paul Howard Winslow, Arlington, Mass.

Application August 10, 1945, Serial No. 609,962

5 Claims. (Cl. 323—7)

This invention relates to current control systems for welding arrangements and it has particular reference to systems of this type in which the operation is controlled by the welder. It is a well known fact that current regulation by the welder in accordance with the requirements of the job to be performed is of primary importance but that great difficulties are experienced in connection with the designing of a practical control system which enables the welder to regulate the current and to observe the results.

The above mentioned difficulties are connected partly with the high amperage of the low voltage currents which have to be used for welding purposes as these currents require the use of cumbersome and heavy regulating equipment if regulation takes place near the arc; partly the difficulties are due to the fact that the welder operates, as a rule, at the end of a long cable linking him with his supply and carrying the welding head which cannot be burdened with heavy and cumbersome equipment.

Remote control arrangements arranged to regulate the current at the source of supply by means of light equipment at or near the welding head require the use of a double or multiple cable connection, while regulation of the welding generator (without remote control) results in a serious loss of time as the welder has to divide his time between "production time" and "arcing" time, the latter period being the time during which the electric arc is burning idly while adjustments are being performed.

The abovementioned drawbacks and inconveniences are of particular importance where numerous welders are simultaneously active on the same object, such as an ocean going ship, an airplane, a bridge, a steel frame for a building or the like. In such cases the welding machines are, as a rule, arranged at some convenient place outside and communication paths between this place and the spots on which the welders are working are frequently difficult to negotiate.

It is, therefore, an object of the present invention to provide a current control system operating in the manner of a remote control system which neither requires long periods of idle operation of the welding equipment for regulation purposes nor an increased number or weight of the connecting cables. The invention consists in a timed relay arrangement associated with the welding arc selectively operated by means of a plurality of resistances contained in an easily portable box which are inserted into the welding arc circuit. These relays are used for regulating the current supply to the welding arc to the desired extent and the adjusting operation is, therefore, performed by the welder and under his constant supervision and it permits to continue or to stop the adjustment or to reverse it in accordance with the observed result and with the judgment of the welder as to the requirements for the special job to be handled.

The invention is described in the following detailed specification containing the description and illustration of one embodiment thereof. It is, however, to be understood that the fact that merely one embodiment of the invention is described and illustrated is not to be interpreted as limitative. The invention is described in such terms and is illustrated in such a way that other embodiments are foreshadowed or are suggested to the expert skilled in the art and these embodiments do not constitute, therefore, a departure from the essence of the invention.

In the accompanying drawing:

Figure 2 is a simplified diagram of connections separating the relay circuits from the other circuits.

Figure 1:
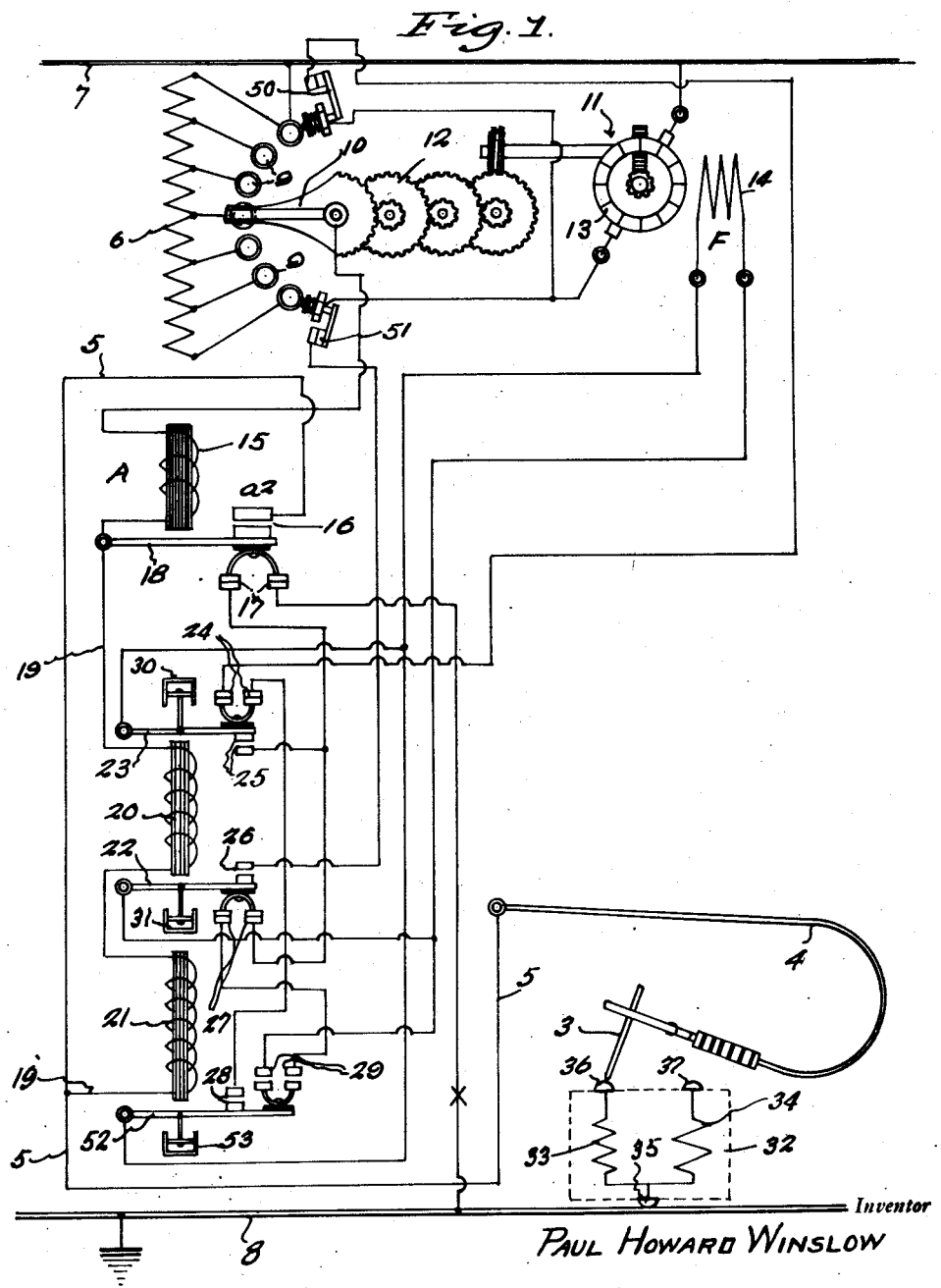
Figure 1 is a diagrammatic view of the arrangement.

As will be seen in Figure 1, the arrangement comprises the welding electrode or rod 3 connected by the cable 4 with the supply conductor 5, which in its turn is connected over the contacts 16 of a relay 15 and over the winding of said relay with the adjustable resistance 6 to the main supply line 7. The latter is directly connected with the usual welding current generator arrangement (not shown).

The conductor 8 is a grounded conductor with which the work piece is connected as usual.

The adjustable resistance preferably comprises a set of contacts 9 and a movable contactor arm 10, the latter being driven by a motor 11 by means of suitable gear wheels 12. Normally closed limit switches 50, 51 are arranged in the path of the contactor arm 10 which control the circuit of the motor 11. These switches are opened by the arm 10 when it has reached the last contact on each side. They close by spring pressure when the arm is moved away from the last contact of the series. The motor 11 comprises an armature 13 and a field winding 14 connected with the supply wire in a manner to be described later.

As above stated supply conductor 5 is connected with the main supply line 7 over the winding of a relay 15 and the pair of contacts 16, operated by its armature 18. This relay is, therefore, energized when the rod 3 receives current and an arc is formed. In a branch circuit 19, two further relays 20, 21 are arranged, each provided with an armature or armatures 22, 23 and 52, respectively. The armatures 22, 23 of the first-named relay 20 control 4 pairs of contacts 24, 25, 26, 27 while the armature 52 of relay 21 controls two pairs of contacts 28, 29.

Moreover, the armature 18 of relay 15 controls a second pair of contacts 17 in addition to the pair already mentioned.

The relays 20 and 21 are slow acting and their armatures 22, 23, 52 operate only after a certain interval of time. This is indicated in the drawings by dashpots 30, 31, 53 associated with them; but it is to be understood that means other than a dashpot may be employed. The retardation is not the same for both relays. Relay 21 will operate after an interval preferably about twice as long as that for which relay 20 has been adjusted. To give a definite example the arrangement may, for instance, be such that relay 18 operates instantaneously, relay 20 operates ½ second after energization, which relay 21 operates 1 second after energization. The figures are arbitrarily selected to illustrate the sequence of operation which is part of the invention.

A further and important part of the invention consists in the control box 32 which is a small box provided with at least two fixed resistances 33, 34 and with means to fix it or to connect it with the grounded conductor 8 whereby one end of said resistance is grounded at 35. It is moreover provided with two contact plates 36, 37 arranged on the outside, each plate being connected with one of said resistances. The box 35 may be so small that the welder may carry it permanently in his pocket or with his equipment or it may be simply placed near each welding spot.

The resistances are appropriately chosen so that when the box 32 has been grounded (at 35) and the welding rod is placed on one of the contact plates 36, 37, a current of a predetermined amperage will flow through the conductor 5.

The relays 18, 20, 21 are so arranged and designed for operation that they will operate their armatures only when a current of a certain minimum amperage is flowing. For instance, relay 18 is operated only when the current flowing through it is approximately that required for the arc, say 40 amps. Relay 20 operates with a reduced amperage say of 10 amps. flowing through the arrangement when the smaller resistance box is used, while relay 21 may operate with a still smaller amperage, say 7 amps., flowing through the arrangement when the larger resistance of the box 32 is used.

Among the contacts governing the flow of current through the armature and field winding of the motor, a number are closed when the relay is deenergized, while a further number are only closed upon energization of the relay controlling them. Thus contacts 17 are normally closed when relay 15 is deenergized, and are opened when energization takes place. Likewise, contacts 24 and 27 of relay 20 are normally closed when the relay is deenergized, while contacts 25 and 26 of relay 20 as well as contacts 28 and 29 of relay 21 close only upon energization of their respective relays.

In Figure 2, the contacts which are normally closed when their relay is deenergized are represented in the closed state; those which are merely closed upon energization of their relay are shown in an open state.

The connections of the armature and field windings of the motor is seen in Figure 2, in which the numerals applied are those of Figure 1. In addition however, the relays 15, 20 and 21 have been provided with the reference letters $a$, $b$ and $c$, respectively and these letters have been added to the reference numerals of the contacts, in order to facilitate orientation in this diagram in which the contacts have been separated from their relays.

It will be seen from the diagram in Figure 2 that no current is flowing through the motor (contact 17$a$ being then open), when the welding rod 3 operates normally, and that current flows through the armature when one of the relays $b$, $c$—20, 21 operates, while relay $a$—15 is deenergized. When relay $b$—20 operates, current flows through the normally open $b$ contacts and when relay $c$—21 operates current flows through one of the normally open $c$ contacts. It will be observed that in both cases the current flows through the armature and field winding in series but the direction of the flow through the field winding changes. When relay $b$—20 is energized current flows through branch section 38, and through branch section 41 to conductor 45 and, therefore, traverses the field winding in the direction of the upper arrow, while when relay $c$—21 closes the current flows from branch section 39 to branch section 40 and traverses the field winding in the direction of the lower arrow.

The operation of the control system will already be clear from the above but may be summarized as follows.

When the welder applies the rod to the welding spot and the arc is passing through it, the amperage of the current will be high. Therefore, relay $a$—15 is energized and contacts $a$—16 are closed while contacts $a$—17 are open. No current flows through the motor 11 and relays $b$—20 and $c$—21 are short circuited and deenergized.

Assuming now that the welder finds that the heat should be increased. He then grounds the box 32 at 35 and applies the rod 3 to contact plate 36 so that current flows through the (larger) resistance 33. The amperage of this current will be small, say 7 amp. Relay $a$—15 falls back as the minimum current to operate it is no longer drawn through conductor 5. Contacts $a$—16 open and contacts $a$—17 close. The current flows through relays $a$, $b$, $c$ in series but only relay $c$—21 operates as the current drawn through conductor 19 can only operate this relay. Relay $c$—21 operates after one second and closes contacts $c$—28 and $c$—29. Current thereby flows through the armature 13 of motor 11 and through branch section 39, winding 14 (in the direction of the lower arrow), branch section 40 and common branch 45.

The motor turns the contactor arm clockwise in Figure 1, thus cutting out part of the resistance 6. The welder holds his rod on to contact 36 until the heat has increased to the required degree. When sufficient heat has been obtained he continues immediately the main job or he may again correct the adjustment. The whole procedure takes only a few seconds. If the welder holds the rod on contact 36 for such a time that arm 10 reaches the last contact, switch 50 is operated opening branch 39 and thus preventing further travel of arm 10 in this direction.

If the welder wants to reduce the heat to be applied he holds the rod to contact 37 of the box. The box resistance 34 now inserted into the circuit is smaller than resistance 33 and, therefore, the amperage of the current will be higher than that above described, say 10 amp., but much below the amperage used for work. Therefore, relay a—15 (if energized) falls back, opening contacts a—16 and closing contacts a—17, while relays b—20 and c—21 are both energized, the current drawn being above their minimum limit.

First relay b—20 is energized closing contacts b—26 and b—25 and opening b—24 and b—27, whereby current flows through armature 13, branch section 38, field winding 14 and branch section 41 to branch 45.

After a short time interval relay c—21 closes contacts c—28 and c—29 but this will not change the direction of current flow through the field winding as contacts b—24 and b—27 have already been opened.

The direction of current flow through field winding 14 is now that of the upper arrow, the motor will turn the contactor arm in an anti-clockwise direction and a larger part of the resistance 6 will be switched in.

When the welder holds the rod to contact 37 of the box for such a time that arm 10 operates limit switch 51, branch 38 will be opened and the circuit through armature 13 of motor 11 is interrupted. The arm is therefore stopped on the last contact of the resistance.

It will be noted that although the limit switches 50, 52 stop the further travel of the arm in one direction by breaking the circuit of the armature operating the contact arm, each switch is only able to do so for a single direction of rotation. If, after the welder happened to operate one of the switches, say switch 50, in order to increase the heat and after he has reached the limit, he decides to reduce the heat and applies the rod to contact 37 the motor will operate as described. The limit switch has no influence on its operation in the other direction.

The limit switches are necessary as the welder does not know when the arm will reach its end position. These switches therefore prevent damage to the adjustable resistance without in any way affecting the operation.

It will be understood that instead of timing the relays separately a slowly operating timing relay may be used, operated by an additional contact of relay c—21 and inserted at a convenient point of branch 45, say at point 44.

The invention, as will be clear from the above specification permits regulation of the arc near or in the welding machine arrangement by the welder while operating the welding rod, without any addition of conductors or cables, and without increasing their weight. No loss of production time is experienced by the control system described. The control is facilitated to such a degree that the adjustment and readjustment may be made after observing results so that the precision and the efficiency of the work performed is greatly increased.

I claim:

1. A current control system for the supply circuit of a load device including a feed line and a return line a remotely controlled variable resistance in the load circuit, and a reversible motor for operating the variable resistance having a field winding and an armature, said system comprising a number of relays operating at different intensities of the current flow to the load device, an operative circuit for the armature and field winding of the motor, said circuit including two parallel branches and a common connection joining said parallel branches to the armature and to the return line, a bridge between the two parallel branches, containing the field winding of the reversible motor, the junction points of the said bridge dividing each parallel branch into two sections, contacts in each section controlled by the aforesaid relays, one relay controlling sections in each of the two parallel branches located at different sides of the junction point of the bridge connection with respect to the feed and return lines, the operation of each relay thus entailing a flow of current through the field winding containing bridge in one direction different from that obtained by the operation of the relay contacts of another relay.

2. A current control system for the load circuit of a load device, including a feed line and a return line a remotely controlled variable resistor in the load circuit, a reversible motor for operating the same, and a number of fixed resistances of different resistance values, selected and manually introduced into the load circuit by an operator for varying the current intensity in the same, said system comprising relays with windings connected in series in the load circuit, each winding becoming operative at a definite current intensity, said relays being arranged in at least two groups, one of said groups including at least one relay operated by a current corresponding to a normal load of the load device, the second group being provided with relay windings each operated by a reduced current corresponding to the insertion of one of the manually operated resistances, and each relay winding being provided with a plurality of relay contacts, an armature and a field winding for the reversible motor, an operative circuit for the same, arranged in parallel with the load circuit between the feed line and return line, said circuit comprising parallel branches and a common current supply branch, a bridge connection bisecting each of the parallel branches into two sections, said bridge connection containing the field winding, of the reversible motor the relays of the second group controlling the bisected branch sections, each relay controlling one section in each branch, the sections so controlled being located on different sides of the bisecting connection with respect to the feed and return lines, and a relay contact of a relay of the first group controlling the common current supply branch.

3. A current control system for the load circuit of a load device, including a remotely controlled variable resistor in the load circuit, a reversible motor for operating the same, and a number of fixed resistances of different resistance values, selected and manually introduced into the load circuit by an operator for varying the current intensity in the same, said system comprising relays with windings connected in series in the load circuit, each winding becoming operative at a definite current intensity, said relays being arranged in at least two groups, one of said groups including at least one relay operated by the normal load current of the load device, the second group containing at least two timed relays operating in succession upon simultaneous energization, the relay windings being energized by reduced currents produced by the insertion of one of the manually operated resistances, the entire second group of relay windings being provided with a short circuit, controlled by the aforementioned relay of the first group, relay contacts for each winding, an armature and a field winding for the reversible motor, an operative circuit for the same, said circuit comprising means including relay contacts operated in succession for reversing the direction of the flow of current in the field winding.

4. A current control system for the load circuit of a load device, including a remotely controlled variable resistor in the load circuit, a reversible motor for operating the same, and a number of fixed resistances of different resistance values, selected and manually introduced into the load circuit by an operator for varying the current intensity supplied to the load device, said system comprising relays with relay contacts and windings connected in series in the load circuit, each winding becoming operative at a definite current intensity, said relays being arranged in at least two alternately operative groups, one of said groups including at least one relay operative at full load, the second group being provided with a short circuit to the relay windings of said second group, controlled by a relay of the first-mentioned group, so as to be operative only at a reduced current intensity and containing at least two timed relays operating in succession upon energization, the relays of the second group being energized by reduced currents produced by the insertion of one of the manually operated resistances, an armature and a field winding for the reversible motor, an operative circuit for the same arranged in shunt with the load circuit, said circuit including two parallel branches and a common current supply branch, a bridge connection bisecting each of the two parallel branches into two sections, the bridge connection containing said field winding of the motor, relay contacts of one of the relays of the second group in each of said branch sections, relay contacts of a further relay operated at a higher current intensity of the second group operating at a different time in two of said branch sections, forming part of different branches, and a relay contact of a relay of the first group controlling the common current supply branch to the said two parallel branches.

5. A current control system for the load circuit of a load device, including a remotely controlled variable resistor in the load circuit, a reversible motor for operating the same, and a number of fixed resistances of different resistance values, selected and manually introduced into the load circuit by an operator for varying the current intensity supplied to the load device, said system comprising two relays operating at different intensities of the current flowing through the load device and in a timed relation to each other, an operative circuit for the armature and field winding of the motor, said circuit including two parallel branches and a common connection joining said parallel branches to the armature and to the current supply, a bridge connection between sections of the two parallel branches, said bridge connection containing the field winding, control means, operated by one relay, in two branch sections of different parallel branches, leading to said bridge connection, control means operated by both relays in the two other sections of different parallel branches leading to said bridge connection, said control means closing the current path through the bridge connection containing the field winding upon operation of one relay at a definite intensity of the current flowing to the load device and closing a different current path with a different direction of flow of current through the bridge connection upon operation of both relays at an increased current intensity.

PAUL HOWARD WINSLOW.

REFERENCES CITED

The following references are of record in the file of this patent:

UNITED STATES PATENTS

| Number | Name | Date |
| --- | --- | --- |
| 1,396,826 | Fortescue | Nov. 15, 1921 |
| 1,873,761 | Gulliksen | Aug. 23, 1932 |
| 2,060,772 | Moffett | Nov. 10, 1936 |
| 2,175,891 | Graham | Oct. 10, 1939 |
| 2,189,603 | Graham | Feb. 6, 1940 |
| 2,438,634 | Farrow | Mar. 30, 1948 |

FOREIGN PATENTS

| Number | Country | Date |
| --- | --- | --- |
| 554,213 | Great Britain | June 24, 1943 |